United States Patent [19]

Cody

[11] Patent Number: 5,042,866
[45] Date of Patent: Aug. 27, 1991

[54] AUTOMOTIVE SUN SCREEN

[76] Inventor: Ernest W. Cody, 2720 Puesta del Sol, Santa Barbara, Calif. 93105

[21] Appl. No.: 597,560

[22] Filed: Oct. 15, 1990

[51] Int. Cl.⁵ .................................................. B60J 3/02
[52] U.S. Cl. ............................. 296/97.4; 296/97.8; 296/141
[58] Field of Search .................. 296/97.4, 97.7, 97.8, 296/140, 141, 143; 160/310, 7, 319

[56] References Cited

U.S. PATENT DOCUMENTS

| | | | |
|---|---|---|---|
| 447,097 | 2/1891 | Zoller et al. | 296/140 X |
| 1,199,604 | 9/1916 | Posey | 296/97.8 |
| 1,281,571 | 10/1918 | Holt | 296/143 X |
| 1,548,396 | 8/1925 | Tavernier | 296/97.8 X |
| 2,279,011 | 4/1942 | Nicholson | 296/97.4 X |
| 4,712,104 | 12/1987 | Kobayashi | 160/310 X |
| 4,874,026 | 10/1989 | Worrall | 160/310 X |

FOREIGN PATENT DOCUMENTS

| | | | |
|---|---|---|---|
| 811653 | 8/1951 | Fed. Rep. of Germany | 296/97.8 |
| 898013 | 4/1945 | France | 296/97.8 |
| 321561 | 11/1929 | United Kingdom | 296/97.8 |

*Primary Examiner*—Dennis H. Pedder
*Attorney, Agent, or Firm*—Leon Gilden

[57] ABSTRACT

An apparatus wherein a flexible shade member is mounted in an initial furled orientation about an upper axle within a housing, with a drive motor to effect furling mounted to the upper axle and a further drive motor mounted to a lower axle to effect unfurling of the screen, with use of limit switches to limit operation of the upper and lower motors relative to the upper and lower axles.

1 Claim, 3 Drawing Sheets

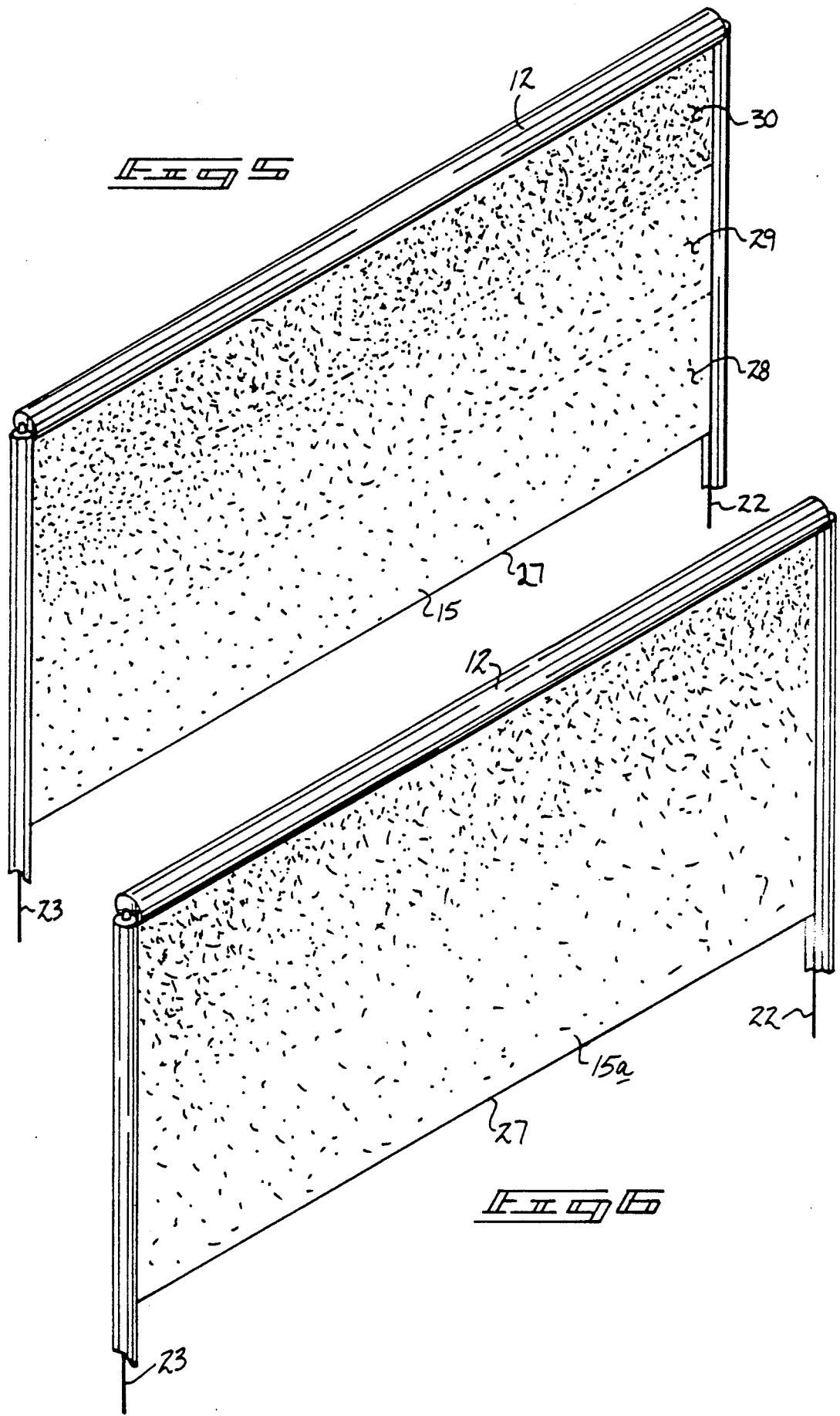

AUTOMOTIVE SUN SCREEN

BACKGROUND OF THE INVENTION

1. Field of the Invention

The field of invention relates to automotive sun screens, and more particularly pertains to a new and improved automotive sun screen wherein the same is positioned for convenient positioning relative to windshield of an automobile.

2. Description of the Prior Art

Various automotive sun screens of various configurations have been utilized throughout the prior art to effect screening and protection of individuals and contents within a passenger car. The instant invention sets forth a convenient organization that is readily arranged to extend a translucent type sun screen relative to an interior passenger compartment of an automobile. Examples of such prior art devices may be found in U.S. Pat. No. 4,497,515 wherein a sun screen member is extended from normal orientation about a spring roller to an extended position and secured by electro-magnetic means.

Labeur U.S. Pat. No. 4,758,041 provides a sun screen protection member wherein a pull bar permits extension of a sun screen from an underlying compartment, with the pull bar mounted on guide rails at each end thereof.

Pearson U.S. Pat. No. 3,092,174 provides a roller blind for use on automotive vehicles to provide surrounding protection relative to a passenger compartment when the blind is pulled downwardly relative to an associated housing within the passenger compartment.

Gavagan U.S. Pat. No. 4,707,018 sets forth a sun shade assembly adjacent a driver for extension and retraction as desired utilizing a stiffener tape mounted within the screen member.

Lin U.S. Pat. No. 4,869,542 provides a sun visor member mounted relative to a dashboard of an automobile and may be extended relative to the dashboard and secured to a clasp member positioned adjacent the roof portion of the passenger compartment of the automobile.

As such, it may be appreciated that there continues to be a need for a new and improved automotive sun screen as set forth by the instant invention which addresses both the problem of ease of use as well as effectiveness in construction in providing motorized extension and retraction of the sun screen organization and in this respect, the present invention substantially fulfills this need.

SUMMARY OF THE INVENTION

In view of the foregoing disadvantages inherent in the known types of automotive sun screens now present in the prior art, the present invention provides an automotive sun screen wherein the same sets forth an organization to permit motorized extension and retraction of a sun screen. As such, the general purpose of the present invention, which will be described subsequently in greater detail, is to provide a new and improved automotive sun screen which has all the advantages of the prior art automotive sun screens and none of the disadvantages.

To attain this, the present invention provides an apparatus wherein a flexible shade member is mounted in an initial furled orientation about an upper axle within a housing, with a drive motor to effect furling mounted to the upper axle and a further drive motor mounted to a lower axle to effect unfurling of the screen, with use of limit switches to limit operation of the upper and lower motors relative to the upper and lower axles.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automotive sun screen which has all the advantages of the prior art automotive sun screens and none of the disadvantages.

It is another object of the present invention to provide a new and improved automotive sun screen which may be easily and efficiently manufactured and marketed.

It is a further object of the present invention to provide a new and improved automotive sun screen which is of a durable and reliable construction.

An even further object of the present invention is to provide a new and improved automotive sun screen which is susceptible of a low cost of manufacture with regard to both materials and labor, and which accordingly is then susceptible of low prices of sale to the consuming public, thereby making such automotive sun screens economically available to the buying public.

Still yet another object of the present invention is to provide a new and improved automotive sun screen which provides in the apparatuses and methods of the prior art some of the advantages thereof, while simultaneously overcoming some of the disadvantages normally associated therewith.

Still another object of the present invention is to provide a new and improved automotive sun screen wherein the same provides a flexible shade member that is extended or retracted relative to a windshield portion of an automobile, wherein the sun shade member may be formed of varying degrees of translucent bands to permit varying levels of light entering the automotive compartment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWING

The invention will be better understood and objects other than those set forth above will become apparent when consideration is given to the following detailed description thereof. Such description makes reference to the annexed drawings wherein:

FIG. 5 is an isometric illustration of the sun screen shade member utilizing a plurality of horizontal bands of various translucent characteristics.

FIG. 6 is an isometric illustration of a modified sun shade member utilizing a single gradient of sun shade to effect varying levels of light entering the passenger compartment of an associated automobile.

DESCRIPTION OF THE PREFERRED EMBODIMENT

Figures 1, 2:
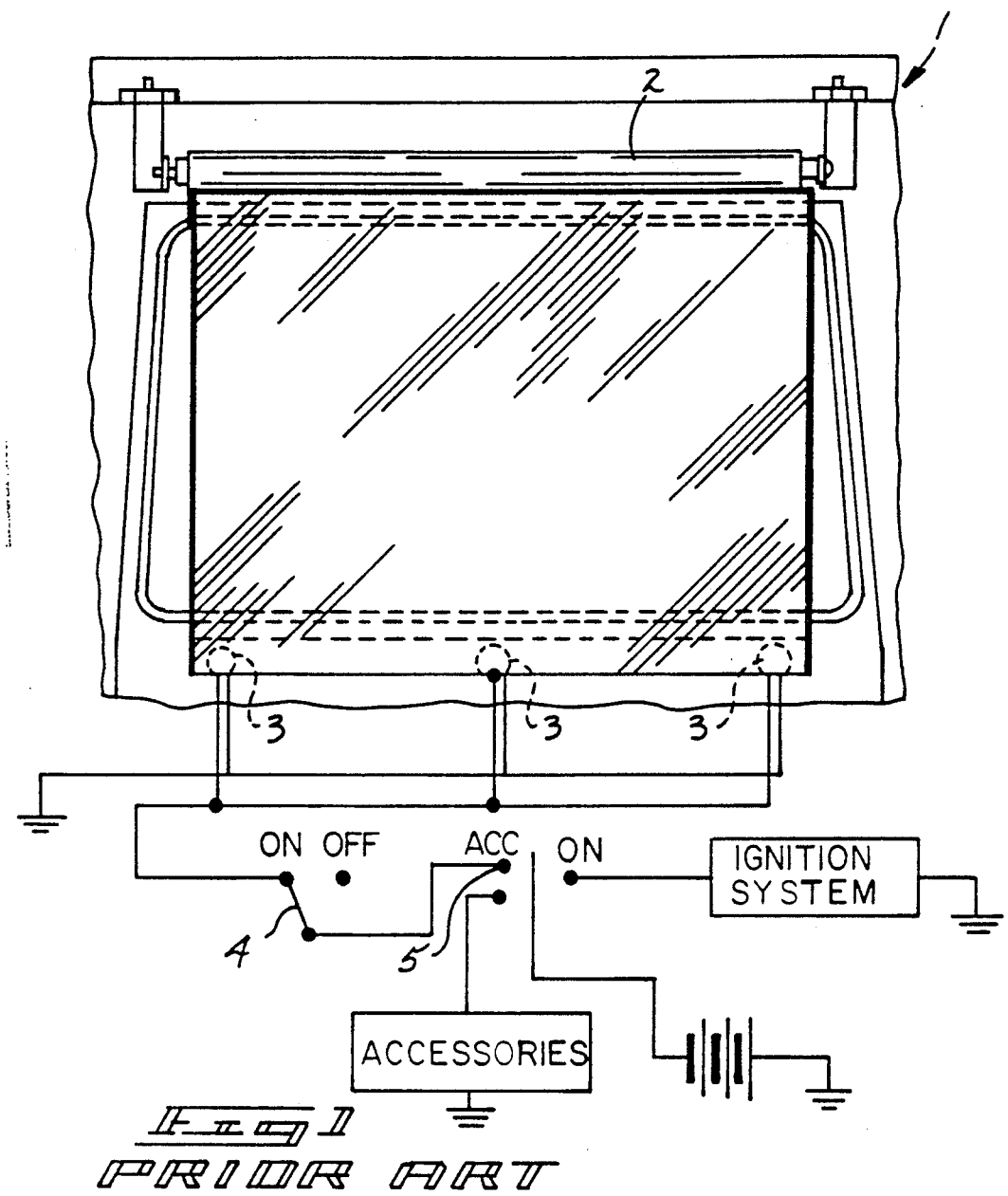
FIG. 1 is an orthographic view setting forth a prior art automotive sun screen organization.
FIG. 2 is an isometric illustration of a further prior art sun screen organization.
Figure 3:
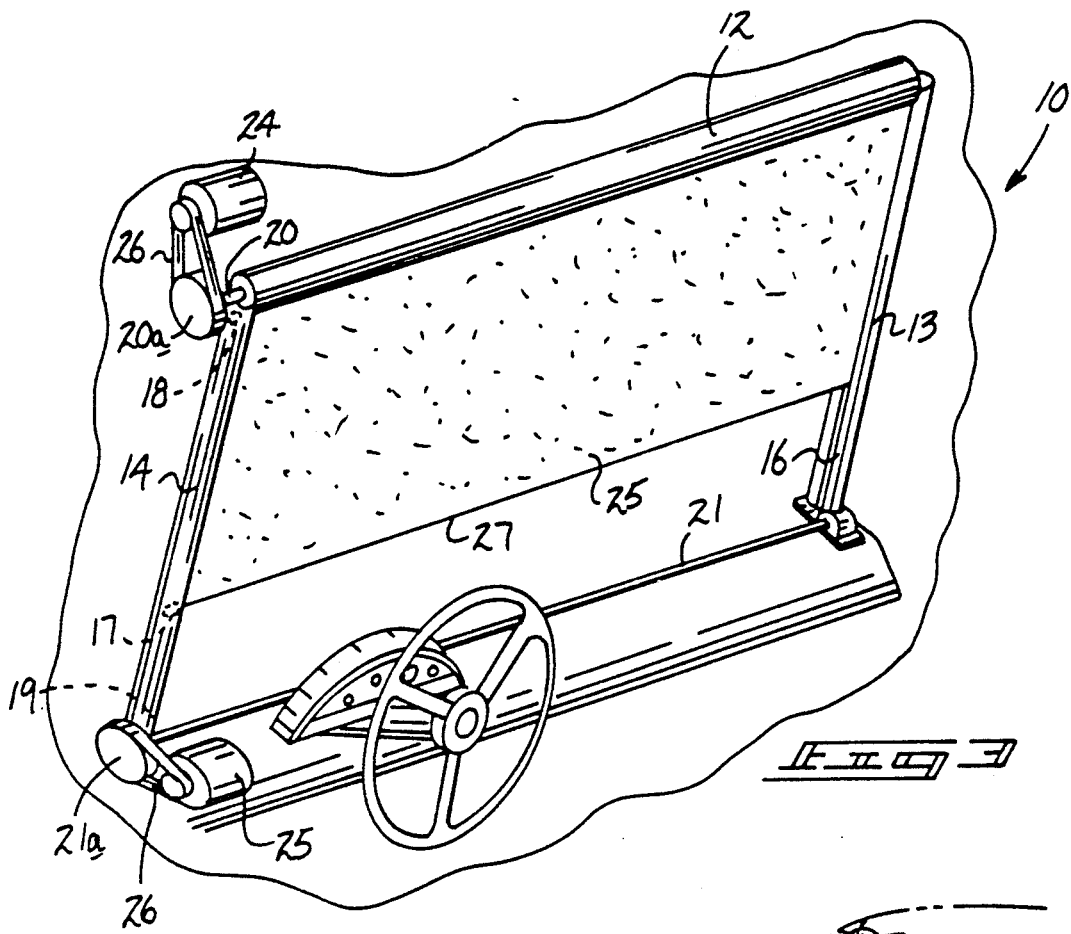
FIG. 3 is an isometric illustration of the instant invention.
Figure 4:
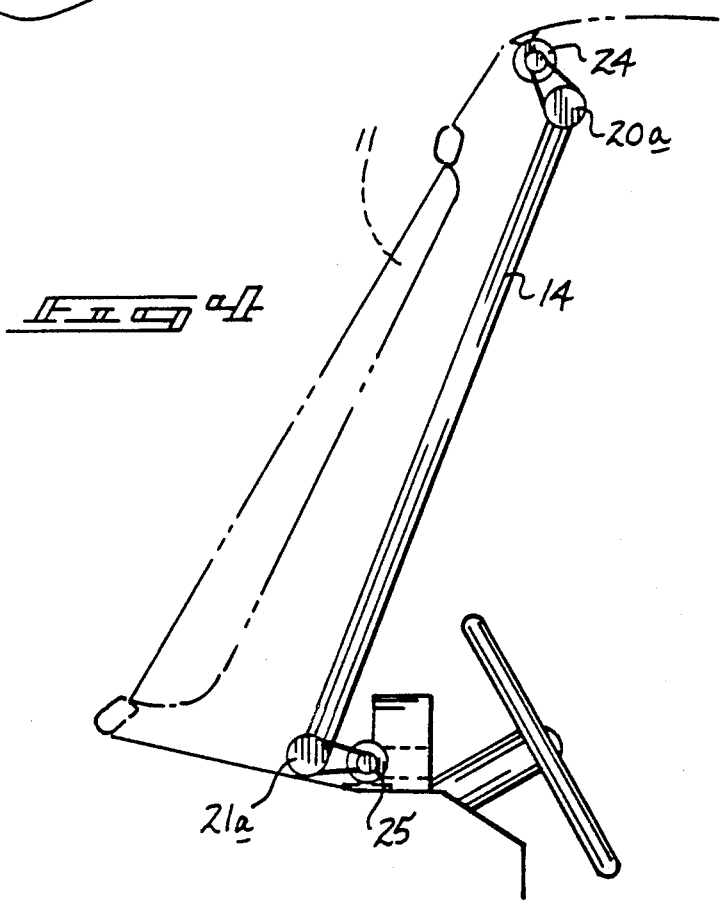
FIG. 4 is an orthographic side view, taken in elevation, of the instant invention.

With reference now to the drawings, and in particular to FIGS. 1 to 6 thereof, a new and improved automotive sun screen embodying the principles and concepts of the present invention and generally designated by the reference numeral 10 will be described.

FIG. 1 sets forth a prior art automotive sun screen organization in cooperation with an ignition switch of an automobile, wherein the organization 1 utilizes a spring-biased roll member 2 that may be extended utilizing electro-magnetic locks 3 cooperative through an on/off switch 4 that in turn is operative through an ignition switch 5 of an automobile, as set forth in U.S. Pat. No. 4,497,515. Further, U.S. Pat. No. 4,758,041 sets forth a sun screen organization 6, wherein a pull bar 7 is mounted within spaced rails 8 to each side of the pull bar to permit extension of the associated sun screen relative to an underlying housing.

More specifically, the automotive sun screen 10 of the instant invention essentially comprises the organization mounted within a passenger compartment of a conventional automobile interiorly and coextensively of an automotive windshield 11. An upper support housing 12 is mounted above the windshield 11 relative to the roof of an automobile, with the housing 12 defined by an elongate coaxially aligned member that includes a right guide track 13 and a left guide track 14 extending orthogonally downwardly relative to the support housing 12, with each guide track terminating in a trunnion to support rotatably a lower axle 21. An upper axle 20 is mounted within the support housing 12. A flexible translucent curtain 15 is mounted to the upper axle 20 and normally contained within the support housing 12 in a furled configuration that is selectively extended in an unfurled configuration in the second position to extend within the right and left guide tracks 13 and 14. Each guide track includes a guide track slot containing the side edge of the curtain 15, with a curtain contact switch 17 mounted to a curtain lowermost horizontal edge 27 that selectively communicates with an upper limit switch 18 mounted adjacent an upper terminal edge of the left guide track 14, or a lower limit switch 19 mounted adjacent a lower terminal end of the left guide track 14 to selectively cease rotative operation of the respective top or bottom windup motor 24 and 25 that are cooperatively mounted rotatably to the upper and lower axles 20 and 21 through upper and lower pulleys 20a and 21a respectively. FIGS. 5 and 6 illustrate the right and left guide lines 22 and 23 that each are mounted to the respective right and left ends of the lower axle 21 that effects rotation of the guide lines about the lower axle and extension of the curtain 15 to its extended configuration. It is further noted that a drive belt 26 of a flexible and conventional construction is utilized to rotatably associate each respective top and bottom windup motor 24 and 25 with each respective upper and lower pulley 20a and 21a.

Reference to FIG. 5 illustrates the curtain 15 employing a translucent first, second, and third horizontal curtain panel 28, 29, and 30 respectively mounted coextensively from the right and left sides defining horizontal panels of varying degrees of translucency, Wherein the first panel 28 is of a greater translucency than the second curtain panel 29 which is of a greater translucency than the third panel 30, which is nearly opaque. Similarly, a modified curtain 15a, as illustrated in FIG. 6, defines a single panel of decreasing translucency from the lowermost horizontal edge 27 upwardly therefrom defining a single, ever darkening gradient ranging from a greater degree of translucency adjacent the edge 27 to an opaque characteristic at the uppermost horizontal end portion of the panel 15a. This permits an operator to descend the curtain of the organization to a limited extent and yet permit the operator to view through the curtain during a driving scenario and yet permit the curtain to screen intense sunlight from the operator during use of the vehicle. The curtain is descended to its lowermost second position when an operator is removed from the vehicle and wishes to protect interior components, such as a dashboard and the like, from the sun's harmful rays.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An automotive sun screen apparatus mounted within an automotive vehicular passenger compartment rearwardly of an automotive windshield, the passenger compartment including an underlying dashboard and an overlying roof, with the apparatus comprising, an upper horizontal support housing mounted adjacent the roof, with the support housing including a right guide track and a left guide track mounted to the respective right and left ends of the support housing, and a flexible curtain retractably mounted within the support housing, and the curtain including a right side edge and a left side edge, with the right side edge guided within the right guide track and the left side edge guided within the left guide track, and the curtain including a lowermost horizontal edge, and further including a right and left guide line extending beyond the lowermost horizontal edge from the right and left sides of the curtain, with the right and left guide line mounted to a lower axis, and an upper motor mounted to the support housing to retractably furl the curtain within the housing in a first position, and a bottom motor operatively mounted to the lower axle to effect extension of the curtain to a second lowered position coextensive with the right and left guide tracks, and wherein the housing includes an upper axle, the upper axle mounted to an uppermost end of the curtain, and the upper axle includes an upper pulley mounted to the upper axle exteriorly of the housing, with the upper pulley operatively mounted to the upper motor, and the lower axle including a lower pulley mounted to the lower axle, with the lower pulley operatively mounted to the bottom motor, and wherein the right and left guide tracks each include an elongate slot, with the right and left side of the curtain received within each slot of the respective right and left guide track, and wherein the curtain includes a contact switch mounted to the curtain at an intersection defined by the lowermost horizontal edge and the left side of the curtain, and a lower limit switch mounted adjacent a lower terminal end of the left guide track, and an upper limit switch mounted adjacent an upper terminal end of the left guide track, wherein the respective lower and upper limit switches cooperate with the contact switch to cease rotation of the respective bottom and top motor, and wherein the curtain is translucent, and wherein the curtain includes a plurality of horizontal panels of varying translucency, including a first horizontal panel, a second horizontal panel, and a third horizontal panel, wherein the first horizontal panel is of a first translucency greater than a second translucency defined by the second panel, and wherein the second translucency is greater than the third translucency defined by the third panel.

* * * * *